United States Patent
Koda et al.

(10) Patent No.: US 9,228,077 B2
(45) Date of Patent: Jan. 5, 2016

(54) RUBBER COMPOSITION AND TIRE

(71) Applicants: KURARAY CO., LTD., Kurashiki-shi (JP); AMYRIS, INC., Emeryville, CA (US)

(72) Inventors: Daisuke Koda, Kamisu (JP); Kei Hirata, Kamisu (JP)

(73) Assignees: KURARAY CO., LTD., Kurashiki-shi (JP); AMYRIS, INC., Emeryville, CA (US)

( * ) Notice: Subject to any disclaimer, the term of this patent is extended or adjusted under 35 U.S.C. 154(b) by 0 days.

(21) Appl. No.: 14/380,534

(22) PCT Filed: Feb. 18, 2013

(86) PCT No.: PCT/JP2013/053904
§ 371 (c)(1),
(2) Date: Aug. 22, 2014

(87) PCT Pub. No.: WO2013/125496
PCT Pub. Date: Aug. 29, 2013

(65) Prior Publication Data
US 2015/0051332 A1    Feb. 19, 2015

(30) Foreign Application Priority Data

Feb. 24, 2012 (JP) ................................ 2012-039413
Feb. 24, 2012 (JP) ................................ 2012-039414

(51) Int. Cl.
| | |
|---|---|
| C08L 9/06 | (2006.01) |
| B60C 1/00 | (2006.01) |
| C08L 21/00 | (2006.01) |
| C08L 47/00 | (2006.01) |
| C08L 7/00 | (2006.01) |
| C08L 9/00 | (2006.01) |
| C08F 136/22 | (2006.01) |

(52) U.S. Cl.
CPC ... *C08L 9/06* (2013.01); *B60C 1/00* (2013.01); *C08F 136/22* (2013.01); *C08L 7/00* (2013.01); *C08L 9/00* (2013.01); *C08L 21/00* (2013.01); *C08L 47/00* (2013.01); *C08K 2201/003* (2013.01)

(58) Field of Classification Search
USPC .......................................... 524/525, 493, 496
See application file for complete search history.

(56) References Cited

U.S. PATENT DOCUMENTS

| | | | |
|---|---|---|---|
| 8,785,542 B2 | 7/2014 | Kuwahara et al. | |
| 2006/0167160 A1* | 7/2006 | Nakagawa et al. | ........... 524/442 |
| 2007/0037908 A1 | 2/2007 | Pille-Wolf | |
| 2010/0056743 A1* | 3/2010 | McPhee | ......................... 526/346 |
| 2012/0237632 A1 | 9/2012 | Phillips et al. | |
| 2012/0269924 A1 | 10/2012 | Phillips et al. | |
| 2014/0213715 A1 | 7/2014 | Kuwahara et al. | |

FOREIGN PATENT DOCUMENTS

| | | |
|---|---|---|
| EP | 0899297 A2 | 8/1998 |
| EP | 1790688 A1 | 5/2007 |
| JP | 2005-047968 A | 2/2005 |
| JP | 2009-120819 | 6/2009 |
| JP | 2010-209256 | 9/2010 |
| JP | 2011-132298 | 7/2011 |
| JP | 2012-502135 | 1/2012 |
| JP | 2012-502136 | 1/2012 |
| WO | 2010/027463 | 3/2010 |
| WO | 2010/027464 | 3/2010 |
| WO | 2011/032026 | 3/2011 |
| WO | 2013/047347 | 4/2013 |
| WO | 2013/047348 | 4/2013 |

OTHER PUBLICATIONS

International Search Report issued May 21, 2013, in PCT/JP13/053904, filed Feb. 18, 2013.
Extended European Search Report issued in corresponding EP Application No. 13751718.1 on Oct. 2, 2015, 5 pp.

* cited by examiner

*Primary Examiner* — Robert Harlan
(74) *Attorney, Agent, or Firm* — Oblon, McClelland, Maier & Neustadt, L.L.P.

(57) ABSTRACT

The present invention relates to a rubber composition including a rubber component (A), a farnesene polymer (B) and silica (C).

16 Claims, No Drawings

RUBBER COMPOSITION AND TIRE

TECHNICAL FIELD

The present invention relates to a rubber composition containing a rubber component, a farnesene polymer and silica, and a tire using the rubber composition.

BACKGROUND ART

Hitherto, in the application field of tires for which a wear resistance and a mechanical strength are required, there have been extensively used rubber compositions that are enhanced in mechanical strength by incorporating a reinforcing agent such as carbon black or silica in a rubber component such as a natural rubber and a styrene-butadiene rubber. When the particle size of the carbon black or silica used in the rubber composition is as large as from about 100 to about 200 nm, it is generally difficult to attain a sufficient interaction between the carbon black or silica and the rubber component, so that the resulting rubber composition tends to be hardly improved in mechanical strength to a sufficient extent. In addition, tires produced from such a rubber composition tend to exhibit a low hardness and therefore tend to be insufficient in steering stability.

On the other hand, when the carbon black or silica used in the rubber composition has an average particle size as small as from about 5 to about 100 nm and therefore a large specific surface area, the resulting rubber composition can be improved in properties such as mechanical strength and wear resistance owing to a large interaction between the carbon black, etc., and the rubber component. In addition, tires produced from such a rubber composition can be improved in steering stability owing to an increased hardness thereof.

However, in the case where the carbon black or silica having such a small average particle size is used in the rubber composition, it is known that the resulting rubber composition tends to be deteriorated in dispersibility of the carbon black or silica therein owing to a high cohesive force between the carbon black or silica particles. The deteriorated dispersibility of the carbon black or silica in the rubber composition tends to induce a prolonged kneading step and therefore tends to give an adverse influence on productivity of the rubber composition. Also, the deteriorated dispersibility of the carbon black or silica tends to cause generation of heat in the rubber composition, so that tires produced therefrom tend to be deteriorated in rolling resistance performance and may frequently fail to satisfy the requirements for low rolling resistance tires (so-called low-fuel consumption tires). Furthermore, in the case where the carbon black or silica used in the rubber composition has a small average particle size, there tends to occur such a problem that the resulting rubber composition exhibits a high viscosity and therefore is deteriorated in processability.

Thus, the mechanical strength and hardness of the rubber composition for tires are properties having a contradictory relation with the rolling resistance performance and processability thereof, and it is therefore considered that the rubber composition is hardly improved in both of the properties in a well-balanced manner.

In Patent Document 1, as a rubber composition that can be improved in the aforementioned properties in a well-balanced manner, there is described a tire including a rubber component containing a diene-based rubber constituted of a modified styrene-butadiene copolymer and a modified conjugated diene-based polymer, and a filler such as carbon black or silica at a predetermined compounding ratio.

However, even the tire described in Patent Document 1 fails to satisfy not only a mechanical strength and a hardness but also a rolling resistance performance and a processability with a sufficiently high level, and therefore there is still a strong demand for tires that are further improved in these properties.

In addition, in Patent Document 2, there is described a rubber composition containing a rubber component, silica and a silane coupling agent having a specific molecular structure at a predetermined compounding ratio.

However, the rubber composition described in Patent Document 2 also fails to satisfy a processability, a rolling resistance performance and a hardness with a sufficiently high level, and therefore there is still a strong demand for rubber compositions that are further improved in these properties.

Meanwhile, Patent Documents 3 and 4 describe a polymer of β-farnesene, but fail to have a sufficient study on practical applications thereof.

CITATION LIST

Patent Literature

Patent Document 1: JP 2010-209256A
Patent Document 2: JP 2009-120819A
Patent Document 3: PCT Pamphlet WO 2010/027463A1
Patent Document 4: PCT Pamphlet WO 2010/027464A1

SUMMARY OF INVENTION

Technical Problem

The present invention has been made in view of the above conventional problems. The present invention provides a rubber composition that exhibits not only a good processability upon compounding, molding or curing, but also an excellent rolling resistance performance owing to an improved dispersibility of carbon black or silica therein, and further hardly suffers from deterioration in mechanical strength and hardness, and a tire obtained using the rubber composition.

Solution to Problem

As a result of extensive and intensive researches, the present inventors have found that when using a conjugated diene-based polymer having a specific structure, the resulting rubber composition can be improved in processability, can exhibit a reduced rolling resistance owing to an improved dispersibility of carbon black and silica therein, and further hardly suffers from deterioration in mechanical strength and hardness. The present invention has been accomplished on the basis of the above finding.

That is, the present invention relates to a rubber composition including a rubber component (A), a farnesene polymer (B) and silica (C).

Advantageous Effects of Invention

According to the present invention, there are provided a rubber composition that has not only a good processability upon compounding, molding or curing, but also an excellent rolling resistance performance owing to an improved dispersibility of carbon black and silica therein, and further hardly suffers from deterioration in mechanical strength and hardness, and a tire obtained using the rubber composition.

DESCRIPTION OF EMBODIMENTS

[Rubber Composition]

The rubber composition according to the present invention includes a rubber component (A), a farnesene polymer (B) and silica (C).

<Rubber Component (A)>

Examples of the rubber component (A) include a styrene-butadiene rubber (hereinafter also referred to merely as "SBR"), a natural rubber, a butadiene rubber, an isoprene rubber, a butyl rubber, a halogenated butyl rubber, an ethylene propylene diene rubber, a butadiene acrylonitrile copolymer rubber and a chloroprene rubber. Among these rubbers, preferred are SBR, a natural rubber, a butadiene rubber and an isoprene rubber, and more preferred is SBR. These rubbers may be used alone or in the form of a mixture of any two or more thereof.

[Synthetic Rubber]

Examples of the preferred synthetic rubber used as the rubber component (A) in the present invention include SBR, a butadiene rubber, an isoprene rubber, a butyl rubber, a halogenated butyl rubber, an ethylene propylene diene rubber, a butadiene acrylonitrile copolymer rubber and a chloroprene rubber. Among these synthetic rubbers, preferred are SBR, an isoprene rubber and a butadiene rubber, and more preferred is SBR.

(SBR (A-I))

As SBR (A-I), there may be used those generally used in the applications of tires. More specifically, the SBR (A-I) preferably has a styrene content of from 0.1 to 70% by mass, more preferably from 5 to 50% by mass, and still more preferably from 15 to 35% by mass. Also, the SBR (A-I) preferably has a vinyl content of from 0.1 to 60% by mass and more preferably from 0.1 to 55% by mass.

The weight-average molecular weight (Mw) of the SBR is preferably from 100,000 to 2,500,000, more preferably from 150,000 to 2,000,000 and still more preferably from 200,000 to 1,500,000. When the weight-average molecular weight of the SBR falls within the above-specified range, the resulting rubber composition can be enhanced in both processability and mechanical strength.

Meanwhile, in the present specification, the weight-average molecular weight is the value measured by the method described below in Examples.

The glass transition temperature (Tg) of the SBR used in the present invention as measured by differential thermal analysis method is preferably from −95° C. to 0° C. and more preferably from −95° C. to −5° C. When adjusting Tg of the SBR to the above-specified range, it is possible to suppress increase in viscosity of the SBR and enhance a handling property thereof.

<<Method for Producing SBR>>

The SBR usable in the present invention may be produced by copolymerizing styrene and butadiene. The production method of the SBR is not particularly limited, and the SBR may be produced by any of an emulsion polymerization method, a solution polymerization method, a vapor phase polymerization method and a bulk polymerization method. Among these polymerization methods, especially preferred are an emulsion polymerization method and a solution polymerization method.

(i) Emulsion-Polymerized Styrene-Butadiene Rubber (E-SBR)

E-SBR may be produced by an ordinary emulsion polymerization method. For example, a predetermined amount of a styrene monomer and a predetermined amount of a butadiene monomer are emulsified and dispersed in the presence of an emulsifying reagent and then subjected to emulsion polymerization using a radical polymerization initiator.

As the emulsifying reagent, there may be used a long-chain fatty acid salt having 10 or more carbon atoms or a rosinic acid salt. Specific examples of the emulsifying reagent include potassium salts and sodium salts of fatty acids such as capric acid, lauric acid, myristic acid, palmitic acid, oleic acid and stearic acid.

As a dispersant for the above emulsion polymerization, there may be usually used water. The dispersant may also contain a waster-soluble organic solvent such as methanol and ethanol unless the use of such an organic solvent gives any adverse influence on stability of the polymerization.

Examples of the radical polymerization initiator include persulfates such as ammonium persulfate and potassium persulfate, organic peroxides and hydrogen peroxide.

In order to suitably adjust a molecular weight of the obtained E-SBR, there may be used a chain transfer reagent. Examples of the chain transfer reagent include mercaptans such as t-dodecyl mercaptan and n-dodecyl mercaptan; and carbon tetrachloride, thioglycolic acid, diterpene, terpinolene, γ-terpinene and an α-methyl styrene dimer.

The temperature used upon the emulsion polymerization may be appropriately determined according to the kind of radical polymerization initiator used therein, and is usually preferably from 0 to 100° C. and more preferably from 0 to 60° C. The polymerization method may be either a continuous polymerization method or a batch polymerization method. The polymerization reaction may be stopped by adding a terminating reagent to the reaction system.

Examples of the terminating reagent include amine compounds such as isopropyl hydroxyl amine, diethyl hydroxyl amine and hydroxyl amine; quinone-based compounds such as hydroquinone and benzoquinone; and sodium nitrite.

After stopping the polymerization reaction, an antioxidant may be added, if required. Furthermore, after stopping the polymerization reaction, unreacted monomers may be removed from the resulting latex, if required. Thereafter, the obtained polymer is coagulated by adding a salt such as sodium chloride, calcium chloride and potassium chloride as a coagulant thereto and, if required, while adjusting a pH value of the coagulation system to a desired value by adding an acid such as nitric acid and sulfuric acid thereto, and then the dispersing solvent is separated from the reaction solution to recover the polymer as a crumb. The thus recovered crumb is washed with water and dehydrated, and then dried using a band dryer or the like to obtain E-SBR. Meanwhile, upon coagulating the polymer, the latex may be previously mixed with an extender oil in the form of an emulsified dispersion to recover the polymer in the form of an oil-extended rubber.

(ii) Solution-Polymerized Styrene-Butadiene Rubber (S-SBR)

S-SBR may be produced by an ordinary solution polymerization method. For example, styrene and butadiene are polymerized in a solvent using an anion-polymerizable active metal, if required, in the presence of a polar compound.

Examples of the anion-polymerizable active metal include alkali metals such as lithium, sodium and potassium; alkali earth metals such as beryllium, magnesium, calcium, strontium and barium; and lanthanoid-based rare earth metals such as lanthanum and neodymium. Among these active metals, preferred are alkali metals and alkali earth metals, and more preferred are alkali metals. The alkali metals are more preferably used in the form of an organic alkali metal compound.

Examples of the solvent include aliphatic hydrocarbons such as n-butane, n-pentane, isopentane, n-hexane, n-heptane and isooctane; alicyclic hydrocarbons such as cyclopentane, cyclohexane and methyl cyclopentane; and aromatic hydrocarbons such as benzene and toluene. These solvents may be usually used in such a range that a monomer is dissolved therein at a concentration of from 1 to 50% by mass.

Specific examples of the organic alkali metal compound include organic monolithium compounds such as n-butyl lithium, sec-butyl lithium, t-butyl lithium, hexyl lithium, phenyl lithium and stilbene lithium; polyfunctional organic lithium compounds such as dilithiomethane, 1,4-dilithiobutane, 1,4-dilithio-2-ethyl cyclohexane and 1,3,5-trilithiobenzene; and sodium naphthalene and potassium naphthalene. Among these organic alkali metal compounds, preferred are organic lithium compounds, and more preferred are organic monolithium compounds. The amount of the organic alkali metal compound used may be appropriately determined according to a molecular weight of S-SBR as required.

The organic alkali metal compound may be used in the form of an organic alkali metal amide by reacting a secondary amine such as dibutyl amine, dihexyl amine and dibenzyl amine therewith.

The polar compound used in the solution polymerization is not particularly limited as long as the compound can be ordinarily used in the anion polymerization for controlling a microstructure of butadiene moieties and distribution of styrene in a copolymer chain thereof without causing deactivation of the reaction. Examples of the polar compound include ether compounds such as dibutyl ether, tetrahydrofuran and ethylene glycol diethyl ether; tertiary amines such as tetramethyl ethylenediamine and trimethylamine; and alkali metal alkoxides and phosphine compounds.

The temperature used in the above polymerization reaction is usually in the range of from −80 to 150° C., preferably from 0 to 100° C. and more preferably from 30 to 90° C. The polymerization method may be either a batch method or a continuous method. Also, in order to improve a random copolymerizability between styrene and butadiene, the styrene and butadiene are preferably supplied to a reaction solution in a continuous or intermittent manner such that a compositional ratio between the styrene and butadiene in the polymerization system falls within a specific range.

The polymerization reaction may be stopped by adding an alcohol such as methanol and isopropanol as a terminating reagent to the reaction system. In addition, before adding the terminating reagent, there may be added a coupling reagent such as tin tetrachloride, tetrachlorosilane, tetramethoxysilane, tetraglycidyl-1,3-bisaminomethyl cyclohexane and 2,4-tolylene diisocyanate which are capable of reacting with an active end of the polymer chain, or a chain end-modifying reagent such as 4,4'-bis(diethylamino)benzophenone and N-vinyl pyrrolidone. The polymerization reaction solution obtained after stopping the polymerization reaction may be directly subjected to drying or steam stripping to remove the solvent therefrom, thereby recovering the S-SBR as aimed. Meanwhile, before removing the solvent, the polymerization reaction solution may be previously mixed with an extender oil to recover the S-SBR in the form of an oil-extended rubber.

(iii) Modified Styrene-Butadiene Rubber (Modified SBR)

In the present invention, there may also be used a modified SBR produced by introducing a functional group into SBR. Examples of the functional group to be introduced into SBR include an amino group, an alkoxysilyl group, a hydroxyl group, an epoxy group and a carboxyl group.

As the method of producing the modified SBR, there may be used, for example, the method in which before adding the terminating reagent, a coupling reagent such as tin tetrachloride, tetrachlorosilane, dimethyl dichlorosilane, dimethyl diethoxysilane, tetramethoxysilane, tetraethoxysilane, 3-aminopropyl triethoxysilane, tetraglycidyl-1,3-bisaminomethyl cyclohexane and 2,4-tolylene diisocyanate which are capable of reacting with an active end of the polymer chain, a chain end-modifying reagent such as 4,4'-bis(diethylamino)benzophenone and N-vinyl pyrrolidone or the other modifying reagents as described in JP 2011-132298A are added to the reaction system.

In the modified SBR, the site of the polymer into which the functional group is introduced may be either a chain end or a side chain of the polymer.

(Isoprene Rubber (A-II))

The isoprene rubber may be a commercially available isoprene rubber which may be obtained by the polymerization using a Ziegler-based catalyst such as titanium tetrahalide-trialkyl aluminum-based catalysts, diethyl aluminum chloride-cobalt-based catalysts, trialkyl aluminum-boron trifluoride-nickel-based catalysts and diethyl aluminum chloride-nickel-based catalysts; a lanthanoid-based rare earth metal catalyst such as triethyl aluminum-organic acid neodymium salt-Lewis acid-based catalysts; and an organic alkali metal compound as used similarly for production of the S-SBR. Among these isoprene rubbers, preferred are isoprene rubbers obtained by the polymerization using the Ziegler-based catalyst because of a high cis isomer content thereof. In addition, there may also be used those isoprene rubbers having an ultrahigh cis isomer content which are produced using the lanthanoid-based rare earth metal catalyst.

The isoprene rubber preferably has a vinyl content of 50% by mass or less, more preferably 40% by mass or less, and still more preferably 30% by mass or less. When the vinyl content of the isoprene rubber is more than 50% by mass, the resulting rubber composition tends to be deteriorated in rolling resistance performance. The lower limit of the vinyl content of the isoprene rubber is not particularly limited. The glass transition temperature of the isoprene rubber may vary depending upon the vinyl content thereof, and is preferably −20° C. or lower and more preferably −30° C. or lower.

The weight-average molecular weight of the isoprene rubber is preferably from 90,000 to 2,000,000 and more preferably from 150,000 to 1,500,000. When the weight-average molecular weight of the isoprene rubber falls within the above-specified range, the resulting rubber composition can exhibit a good processability and a good mechanical strength.

The isoprene rubber may partially have a branched structure or may partially contain a polar functional group by using a polyfunctional type modifying reagent, for example, a modifying reagent such as tin tetrachloride, silicon tetrachloride, an alkoxysilane containing an epoxy group in a molecule thereof, and an amino group-containing alkoxysilane.

(Butadiene Rubber (A-III))

The butadiene rubber may be a commercially available butadiene rubber which may be obtained by the polymerization using a Ziegler-based catalyst such as titanium tetrahalide-trialkyl aluminum-based catalysts, diethyl aluminum chloride-cobalt-based catalysts, trialkyl aluminum-boron trifluoride-nickel-based catalysts and diethyl aluminum chloride-nickel-based catalysts; a lanthanoid-based rare earth metal catalyst such as triethyl aluminum-organic acid neodymium salt-Lewis acid-based catalysts; and an organic alkali metal compound as used similarly for production of the S-SBR. Among these butadiene rubbers, preferred are butadiene rubbers obtained by the polymerization using the Ziegler-based catalyst because of a high cis isomer content thereof. In addition, there may also be used those butadiene rubbers having an ultrahigh cis isomer content which are produced using the lanthanoid-based rare earth metal catalyst.

The butadiene rubber preferably has a vinyl content of 50% by mass or less, more preferably 40% by mass or less, and still more preferably 30% by mass or less. When the vinyl content of the butadiene rubber is more than 50% by mass, the resulting rubber composition tends to be deteriorated in rolling resistance performance. The lower limit of the vinyl content of the butadiene rubber is not particularly limited. The glass transition temperature of the butadiene rubber may vary depending upon the vinyl content thereof, and is preferably −40° C. or lower and more preferably −50° C. or lower.

The weight-average molecular weight of the butadiene rubber is preferably from 90,000 to 2,000,000 and more preferably from 150,000 to 1,500,000. When the weight-average molecular weight of the butadiene rubber falls within the above-specified range, the resulting rubber composition can exhibit a good processability and a good mechanical strength.

The butadiene rubber may partially have a branched structure or may partially contain a polar functional group by using a polyfunctional type modifying reagent, for example, a modifying reagent such as tin tetrachloride, silicon tetrachloride, an alkoxysilane containing an epoxy group in a molecule thereof, and an amino group-containing alkoxysilane.

As the rubber component, in addition to at least one of the SBR, the isoprene rubber and the butadiene rubber, there may be used one or more rubbers selected from the group consisting of a butyl rubber, a halogenated butyl rubber, an ethylene propylene diene rubber, a butadiene acrylonitrile copolymer rubber and a chloroprene rubber. The method of producing these rubbers is not particularly limited, and any suitable commercially available rubbers may also be used in the present invention.

In the present invention, when using the SBR, the isoprene rubber, the butadiene rubber and the other synthetic rubbers in combination with the below-mentioned farnesene polymer (B), it is possible to improve a processability of the resulting rubber composition, a dispersibility of carbon black therein and a rolling resistance performance thereof.

When using a mixture of two or more kinds of synthetic rubbers, the combination of the synthetic rubbers may be optionally selected unless the effects of the present invention are adversely influenced. Also, various properties of the resulting rubber composition such as a rolling resistance performance and a wear resistance may be appropriately controlled by selecting a suitable combination of the synthetic rubbers.

[Natural Rubber]

Examples of the natural rubber used as the rubber component (A) in the present invention include TSR such as SMR, SIR and STR; natural rubbers ordinarily used in tire industries, such as RSS; high-purity natural rubbers; and modified natural rubbers such as epoxidized natural rubbers, hydroxylated natural rubbers, hydrogenated natural rubbers and grafted natural rubbers. Among these natural rubbers, SMR20 and RSS#3 are preferred from the viewpoints of a less variation in quality and a good availability. These natural rubbers may be used alone or in combination of any two or more thereof.

Meanwhile, the method of producing the rubber used as the rubber component (A) in the present invention is not particularly limited, and any suitable commercially available products may be used as the rubber.

In the present invention, by using the rubber component (A) in combination with the below-mentioned farnesene polymer (B), the resulting rubber composition can be improved in a processability, a dispersibility of carbon black therein, and a rolling resistance performance.

<Farnesene Polymer (B)>

The rubber composition of the present invention contains a farnesene polymer (B) (hereinafter also referred to merely as the "polymer (B)").

The farnesene polymer (B) used in the present invention is preferably a polymer produced by polymerizing (β-farnesene represented by the following formula (I) by the below-mentioned method, and is more preferably a homopolymer of β-farnesene.

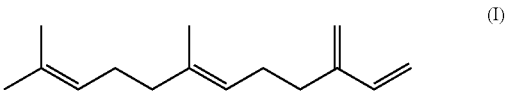

(I)

The weight-average molecular weight of the polymer (B) is preferably from 2,000 to 500,000, more preferably from 8,000 to 500,000, still more preferably from 15,000 to 450,000 and most preferably from 15,000 to 300,000. When the weight-average molecular weight of the polymer falls within the above-specified range, the resulting rubber composition according to the present invention has a good processability, and further can be improved in dispersibility of the silica (C) and the carbon black (D) therein and therefore can exhibit a good rolling resistance performance. Meanwhile, the weight-average molecular weight of the polymer (B) used in the present specification is the value measured by the method described in Examples below.

In the present invention, two or more kinds of polymers (B) that are different in weight-average molecular weight from each other may be used in the form of a mixture thereof.

The melt viscosity (as measured at 38° C.) of the polymer (B) is preferably from 0.1 to 3,000 Pa·s, more preferably from 0.6 to 3,000 Pa·s, still more preferably from 0.6 to 2,800 Pa·s, even still more preferably from 1.5 to 2,600 Pa·s and most preferably from 1.5 to 800 Pa·s. When the melt viscosity of the polymer (B) falls within the above-specified range, the resulting rubber composition can be easily kneaded and can be improved in processability. Meanwhile, in the present specification, the melt viscosity of the polymer (B) is the value measured by the method described in Examples below.

The molecular weight distribution (Mw/Mn) of the polymer (B) is preferably from 1.0 to 8.0, more preferably from 1.0 to 5.0 and still more preferably from 1.0 to 3.0. When the molecular weight distribution (Mw/Mn) of the polymer (B) falls within the above-specified range, the resulting polymer (B) can suitably exhibit a less variation in viscosity thereof.

The glass transition temperature of the polymer (B) may vary depending upon a vinyl content or contents of the other monomers therein, and is preferably from −90 to 0° C. and more preferably from −90 to −10° C. When the glass transition temperature of the polymer (B) falls within the above-specified range, the resulting rubber composition can exhibit a good rolling resistance performance. The vinyl content of the polymer (B) is preferably 99% by mass or less and more preferably 90% by mass or less.

In the present invention, the polymer (B) is preferably compounded in an amount of from 0.1 to 100 parts by mass, more preferably from 0.5 to 50 parts by mass and still more preferably from 1 to 30 parts by mass on the basis of 100 parts by mass of the rubber component (A). When the amount of the polymer (B) compounded falls within the above-specified range, the resulting rubber composition can exhibit good processability, mechanical strength and rolling resistance performance.

The polymer (B) may be produced by an emulsion polymerization method, the methods described in PCT pamphlet WO 2010/027463A1 and PCT pamphlet WO 2010/027464A1 or the like. Among these polymerization methods, preferred are an emulsion polymerization method and a solution polymerization method, and more preferred is a solution polymerization method.

(Emulsion Polymerization Method)

The emulsion polymerization method for producing the polymer (B) may be any suitable conventionally known method. For example, a predetermined amount of a farnesene monomer is emulsified and dispersed in the presence of an emulsifying reagent, and then the resulting emulsion is subjected to emulsion polymerization using a radical polymerization initiator.

As the emulsifying reagent, there may be used, for example, a long-chain fatty acid salt having 10 or more carbon atoms or a rosinic acid salt. Specific examples of the emulsifying reagent include potassium salts and sodium salts of fatty acids such as capric acid, lauric acid, myristic acid, palmitic acid, oleic acid and stearic acid.

As the dispersant for the emulsion polymerization, there may be usually used water, and the dispersant may also contain a water-soluble organic solvent such as methanol and ethanol unless the use of such an organic solvent gives any adverse influence on stability of the polymerization.

Examples of the radical polymerization initiator include persulfates such as ammonium persulfate and potassium persulfate; and organic peroxides and hydrogen peroxide.

In order to adjust a molecular weight of the resulting polymer (B), there may be used a chain transfer reagent. Examples of the chain transfer reagent include mercaptans such as t-dodecyl mercaptan and n-dodecyl mercaptan; and carbon tetrachloride, thioglycolic acid, diterpene, terpinolene, γ-terpinene and an α-methyl styrene dimer.

The temperature used upon the emulsion polymerization may be appropriately determined according to the kind of radical polymerization initiator used therein, and is usually preferably from 0 to 100° C. and more preferably from 0 to 60° C. The polymerization method may be either a continuous polymerization method or a batch polymerization method. The polymerization reaction may be stopped by adding a terminating reagent to the reaction system.

Examples of the terminating reagent include amine compounds such as isopropyl hydroxyl amine, diethyl hydroxyl amine and hydroxyl amine; quinone-based compounds such as hydroquinone and benzoquinone; and sodium nitrite.

After stopping the polymerization reaction, an antioxidant may be added, if required. Furthermore, after stopping the polymerization reaction, unreacted monomers may be removed from the resulting latex, if required. Thereafter, the resulting polymer (B) is coagulated by adding a salt such as sodium chloride, calcium chloride and potassium chloride as a coagulant thereto and, if required, while adjusting a pH value of the coagulation system to a desired value by adding an acid such as nitric acid and sulfuric acid thereto, and then the dispersing solvent is separated from the reaction solution to recover the polymer (B). The thus recovered polymer is washed with water and dehydrated, and then dried to obtain the polymer (B). Meanwhile, upon coagulating the polymer, the latex may be previously mixed, if required, with an extender oil in the form of an emulsified dispersion to recover the polymer (B) in the form of an oil-extended rubber.

(Solution Polymerization Method)

The solution polymerization method for producing the polymer (B) may be any suitable conventionally known method. For example, a farnesene monomer may be polymerized in a solvent using a Ziegler-based catalyst, a metallocene-based catalyst or an anion-polymerizable active metal, if required, in the presence of a polar compound.

Examples of the anion-polymerizable active metal include alkali metals such as lithium, sodium and potassium; alkali earth metals such as beryllium, magnesium, calcium, strontium and barium; and lanthanoid-based rare earth metals such as lanthanum and neodymium. Among these active metals, preferred are alkali metals and alkali earth metals, and more preferred are alkali metals. The alkali metals are more preferably used in the form of an organic alkali metal compound.

Examples of the solvent used in the solution polymerization include aliphatic hydrocarbons such as n-butane, n-pentane, isopentane, n-hexane, n-heptane and isooctane; alicyclic hydrocarbons such as cyclopentane, cyclohexane and methyl cyclopentane; and aromatic hydrocarbons such as benzene, toluene and xylene.

Specific examples of the organic alkali metal compound include organic monolithium compounds such as methyl lithium, ethyl lithium, n-butyl lithium, sec-butyl lithium, t-butyl lithium, hexyl lithium, phenyl lithium and stilbene lithium; polyfunctional organic lithium compounds such as dilithiomethane, dilithionaphthalene, 1,4-dilithiobutane, 1,4-dilithio-2-ethyl cyclohexane and 1,3,5-trilithiobenzene; and sodium naphthalene and potassium naphthalene. Among these organic alkali metal compounds, preferred are organic lithium compounds, and more preferred are organic monolithium compounds. The amount of the organic alkali metal compound used may be appropriately determined according to a molecular weight of the farnesene polymer as required, and is preferably from 0.01 to 3 parts by mass on the basis of 100 parts by mass of farnesene.

The organic alkali metal compound may be used in the form of an organic alkali metal amide by reacting a secondary amine such as dibutyl amine, dihexyl amine and dibenzyl amine therewith.

The polar compound may be used in the anion polymerization for controlling a microstructure of farnesene moieties without causing deactivation of the reaction. Examples of the polar compound include ether compounds such as dibutyl ether, tetrahydrofuran and ethylene glycol diethyl ether; tertiary amines such as tetramethyl ethylenediamine and trimethylamine; and alkali metal alkoxides and phosphine compounds. The polar compound is preferably used in an amount of from 0.01 to 1,000 mol equivalent on the basis of the organic alkali metal compound.

The temperature used in the above polymerization reaction is usually from −80 to 150° C., preferably from 0 to 100° C. and more preferably from 10 to 90° C. The polymerization method may be either a batch method or a continuous method.

The polymerization reaction may be stopped by adding a terminating reagent such as methanol and isopropanol to the reaction system. The resulting polymerization reaction solution may be poured into a poor solvent such as methanol to precipitate the polymer (B). Alternatively, the polymerization reaction solution may be washed with water, and then a solid is separated therefrom and dried to isolate the polymer (B) therefrom.

(Modified Polymer)

The thus obtained polymer (B) may be subjected to modification treatment. Examples of a functional group used in the modification treatment include an amino group, an amide group, an imino group, an imidazole group, a urea group, an alkoxysilyl group, a hydroxyl group, an epoxy group, an ether group, a carboxyl group, a carbonyl group, a mercapto group, an isocyanate group, a nitrile group and an acid anhydride group.

As the method of producing the modified polymer, there may be used, for example, the method in which before adding the terminating reagent, a coupling reagent such as tin tetrachloride, dibutyl tin chloride, tetrachlorosilane, dimethyl dichlorosilane, dimethyl diethoxysilane, tetramethoxysilane, tetraethoxysilane, 3-aminopropyl triethoxysilane, tetraglycidyl-1,3-bisaminomethyl cyclohexane and 2,4-tolylene diisocyanate which are capable of reacting with an active end of the polymer chain, a chain end-modifying reagent such as 4,4'-bis(diethylamino)benzophenone, N-vinyl pyrrolidone, N-methyl pyrrolidone, 4-dimethylaminobenzylidene aniline and dimethyl imidazolidinone, or the other modifying reagents as described in JP 2011-132298A are added to the polymerization reaction system. Furthermore, the isolated polymer when used may be grafted with maleic anhydride or the like.

In the modified polymer, the site of the polymer into which the functional group is introduced may be either a chain end or a side chain of the polymer. In addition, these functional groups may be used in combination of any two or more thereof. The modifying reagent may be used in an amount of from 0.1 to 10 mol equivalent on the basis of the organic alkali metal compound.

<Silica>

Examples of the silica (C) include wet silica (hydrous silica), dry silica (anhydrous silica), calcium silicate and aluminum silicate. Of these silicas, from the viewpoint of further improving a processability, a mechanical strength and a wear resistance of the resulting rubber composition, preferred is wet silica. These silicas may be used alone or in the form of a mixture of any two or more thereof.

The average particle size of the silica (C) is preferably from 0.5 to 200 nm, more preferably from 5 to 150 nm, and still more preferably from 10 to 100 nm from the viewpoint of improving a processability, a rolling resistance performance, a mechanical strength and a wear resistance of the resulting rubber composition.

Meanwhile, the average particle size of the silica (C) may be determined by measuring diameters of the silica particles by a transmission electron microscope and calculating an average value of the measured diameters.

The silica (C) is compounded in the rubber composition in an amount of from 0.1 to 150 parts by mass, more preferably from 0.5 to 130 parts by mass and still more preferably from 5 to 100 parts by mass on the basis of 100 parts by mass of the rubber component (A). When the amount of the silica compounded falls within the above-specified range, the resulting rubber composition can be improved in a processability, a rolling resistance performance, a mechanical strength and a wear resistance.

<Carbon Black (D)>

Examples of the carbon black (D) include carbon blacks such as furnace black, channel black, thermal black, acetylene black and Ketjen black. Among these carbon blacks, from the viewpoints of a high curing rate and an improved mechanical strength of the rubber composition, preferred is furnace black.

The carbon black (D) preferably has an average particle size of from 5 to 100 nm, more preferably from 5 to 80 nm, and still more preferably from 5 to 70 nm form the viewpoint of enhancing a dispersibility, a mechanical strength and a hardness of the resulting rubber composition.

Examples of commercially available furnace black as the carbon black (D) having an average particle size of from 5 to 100 nm include "DIABLACK" available from Mitsubishi Chemical Corp., and "SEAST" available from Tokai Carbon Co., Ltd. Examples of commercially available acetylene black as the carbon black (D) having an average particle size of from 5 to 100 nm include "DENKABLACK" available from Denki Kagaku Kogyo K.K. Examples of commercially available Ketjen black as the carbon black (D) having an average particle size of from 5 to 100 nm include "ECP600JD" available from Lion Corp.

The carbon black (D) may be subjected to an acid treatment with nitric acid, sulfuric acid, hydrochloric acid or a mixed acid thereof or may be subjected to a heat treatment in the presence of air for conducting a surface oxidation treatment thereof, from the viewpoint of improving a wettability or a dispersibility of the carbon black (D) in the rubber component (A) and the polymer (B). In addition, from the viewpoint of improving a mechanical strength of the rubber composition of the present invention, the carbon black may be subjected to a heat treatment at a temperature of from 2,000 to 3,000° C. in the presence of a graphitization catalyst. As the graphitization catalyst, there may be suitably used boron, boron oxides (such as, for example, $B_2O_2$, $B_2O_3$, $B_4O_3$ and $B_4O_5$), oxo acids of boron (such as, for example, orthoboric acid, metaboric acid and tetraboric acid) and salts thereof, boron carbonates (such as, for example, $B_4C$ and $B_6C$), boron nitride (such as BN) and other boron compounds.

The particle size of the carbon black (D) may be controlled by pulverization or the like. In order to pulverize the carbon black (D), there may be used a high-speed rotary mill (such as a hammer mill, a pin mil and a cage mill) or various ball mills (such as a rolling mill, a vibration mill and a planetary mill), a stirring mill (such as a beads mill, an attritor, a flow tube mill and an annular mill) or the like.

Meanwhile, the average particle size of the carbon black (D) may be determined by measuring diameters of carbon black particles using a transmission type electron microscope and calculating an average value of the measured diameters.

In the rubber composition of the present invention, the carbon black (D) is preferably compounded in an amount of from 0.1 to 150 parts by mass, more preferably from 0.1 to 130 parts by mass, and still more preferably from 0.1 to 100 parts by mass on the basis of 100 parts by mass of the rubber component (A). When the amount of the carbon black (D) compounded falls within the above-specified range, the resulting rubber composition exhibits good mechanical strength, hardness and processability, and the carbon black (D) has a good dispersibility in the rubber composition.

<Optional Components>
(Silane Coupling Reagent)

The rubber composition of the present invention preferably contains a silane coupling reagent. Examples of the silane coupling reagent include a sulfide-based compound, a mercapto-based compound, a vinyl-based compound, an amino-based compound, a glycidoxy-based compound, a nitro-based compound and a chloro-based compound.

Specific examples of the sulfide-based compound include bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, bis(3-triethoxysilylpropyl)trisulfide, bis(3-trimethoxysilylpropyl)trisulfide, bis(3-triethoxysilylpropyl)disulfide, bis(3-trimethoxysilylpropyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-trimethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide and 3-trimethoxysilylpropyl methacrylate monosulfide.

Specific examples of the mercapto-based compound include 3-mercaptopropyl trimethoxysilane, 3-mercaptopropyl triethoxysilane, 2-mercaptoethyl trimethoxysilane and 2-mercaptoethyl triethoxysilane.

Specific examples of the vinyl-based compound include vinyl triethoxysilane and vinyl trimethoxysilane.

Specific examples of the amino-based compound include 3-aminopropyl triethoxysilane, 3-aminopropyl trimethoxysilane, 3-(2-aminoethyl)aminopropyl triethoxysilane and 3-(2-aminoethyl)aminopropyl trimethoxysilane.

Specific examples of the glycidoxy-based compound include γ-glycidoxypropyl triethoxysilane, γ-glycidoxypropyl trimethoxysilane, γ-glycidoxypropylmethyl diethoxysilane and γ-glycidoxypropylmethyl dimethoxysilane.

Specific examples of the nitro-based compound include 3-nitropropyl trimethoxysilane and 3-nitropropyl triethoxysilane.

Specific examples of the chloro-based compound include 3-chloropropyl trimethoxysilane, 3-chloropropyl triethoxysilane, 2-chloroethyl trimethoxysilane and 2-chloroethyl triethoxysilane.

These silane coupling reagents may be used alone or in the form of a mixture of any two or more thereof. Of these silane coupling reagents, bis(3-triethoxysilylpropyl)disulfide, bis(3-triethoxysilylpropyl)tetrasulfide and 3-mercaptopropyl trimethoxysilane are preferred from the viewpoints of a large addition effect and low costs.

The silane coupling reagent is preferably compounded in the rubber composition in an amount of from 0.1 to 30 parts by mass, more preferably from 0.5 to 20 parts by mass, and still more preferably from 1 to 15 parts by mass on the basis of 100 parts by mass of the silica (C). When the amount of the silane coupling reagent compounded falls within the above-specified range, the resulting rubber composition can be enhanced in dispersibility, coupling effect, reinforcing property and wear resistance.

(Other Fillers)

For the purposes of enhancing a mechanical strength of the rubber composition, improving various properties such as a heat resistance and a weathering resistance thereof, controlling a hardness thereof, and further improving economy by adding an extender thereto, the rubber composition may also contain a filler other than the silica (C) and carbon black (D), if required.

The filler other than the silica (C) and carbon black (D) may be appropriately selected according to the applications of the obtained rubber composition. For example, as the filler, there may be used one or more fillers selected from the group consisting of organic fillers, and inorganic fillers such as clay, talc, mica, calcium carbonate, magnesium hydroxide, aluminum hydroxide, barium sulfate, titanium oxide, glass fibers, fibrous fillers and glass balloons. The above filler is preferably compounded in the rubber composition of the present invention in an amount of from 0.1 to 120 parts by mass, more preferably from 5 to 90 parts by mass and still more preferably from 10 to 80 parts by mass on the basis of 100 parts by mass of the rubber component (A). When the amount of the filler compounded falls within the above-specified range, the resulting rubber composition can be furthermore improved in mechanical strength.

The rubber composition of the present invention may also contain, if required, a softening reagent for the purpose of improving a processability, a flowability or the like of the resulting rubber composition unless the effects of the present invention are adversely influenced. Examples of the softening reagent include a process oil such as a silicone oil, an aroma oil, TDAE (treated distilled aromatic extracts), MES (mild extracted solvates), RAE (residual aromatic extracts), a paraffin oil and a naphthene oil; and a liquid polymer such as a low-molecular weight polybutadiene, a low-molecular weight polyisoprene, a low-molecular weight styrene-butadiene copolymer and a low-molecular weight styrene-isoprene copolymer. Meanwhile, the above copolymers may be in the form of either a block copolymer or a random copolymer. The liquid polymer preferably has a weight-average molecular weight of from 500 to 100,000 from the viewpoint of a good processability of the resulting rubber composition. The above process oil or liquid polymer as the softening reagent is preferably compounded in the rubber composition of the present invention in an amount of less than 50 parts by mass on the basis of 100 parts by mass of the rubber component (A).

The rubber composition of the present invention may also contain, if required, one or more additives selected from the group consisting of an antioxidant, an oxidation inhibitor, a lubricant, a light stabilizer, a scorch retarder, a processing aid, a colorant such as pigments and coloring matters, a flame retardant, an antistatic reagent, a delustering reagent, an anti-blocking reagent, an ultraviolet absorber, a release reagent, a foaming reagent, an antimicrobial reagent, a mildew-proofing reagent and a perfume, for the purposes of improving a weathering resistance, a heat resistance, an oxidation resistance or the like of the resulting rubber composition, unless the effects of the present invention are adversely influenced.

Examples of the oxidation inhibitor include hindered phenol-based compounds, phosphorus-based compounds, lactone-based compounds and hydroxyl-based compounds.

Examples of the antioxidant include amine-ketone-based compounds, imidazole-based compounds, amine-based compounds, phenol-based compounds, sulfur-based compounds and phosphorus-based compounds.

The rubber composition of the present invention is preferably used in the from of a crosslinked product produced by adding a crosslinking reagent thereto. Examples of the crosslinking reagent include sulfur and sulfur compounds, oxygen, organic peroxides, phenol resins and amino resins, quinone and quinone dioxime derivatives, halogen compounds, aldehyde compounds, alcohol compounds, epoxy compounds, metal halides and organic metal halides, and silane compounds. Among these crosslinking reagents, preferred are sulfur and sulfur compounds. These crosslinking reagents may be used alone or in combination of any two or more thereof. The crosslinking reagent is preferably compounded in the rubber composition in an amount of from 0.1 to 10 parts by mass on the basis of 100 parts by mass of the rubber component (A).

When using sulfur as the crosslinking reagent, a vulcanization aid or a vulcanization accelerator is preferably used in combination with the crosslinking reagent.

Examples of the vulcanization aid include fatty acids such as stearic acid and metal oxides such as zinc oxide.

Examples of the vulcanization accelerator include guanidine-based compounds, sulfene amide-based compounds, thiazole-based compounds, thiuram-based compounds, thiourea-based compounds, dithiocarbamic acid-based compounds, aldehyde-amine-based compounds or aldehyde-ammonia-based compounds, imidazoline-based compounds and xanthate-based compounds. These vulcanization aids or vulcanization accelerators may be used alone or in combination of any two or more thereof. The vulcanization aid or vulcanization accelerator is preferably compounded in the rubber composition of the present invention in an amount of from 0.1 to 15 parts by mass on the basis of 100 parts by mass of the rubber component (A).

The method for producing the rubber composition of the present invention is not particularly limited, and any suitable method may be used in the present invention as long as the respective components are uniformly mixed with each other. The method of uniformly mixing the respective components may be carried out using a closed type kneader of a tangential type or a meshing type such as a kneader rudder, a Brabender, a Banbury mixer and an internal mixer, a single-screw extruder, a twin-screw extruder, a mixing roll, a roller or the like in a temperature range of usually from 70 to 270° C.

[Tire]

The tire of the present invention is produced by using the rubber composition of the present invention at least in a part thereof, and therefore can exhibit a good mechanical strength and an excellent rolling resistance performance.

EXAMPLES

The present invention will be described in more detail below by referring to the following examples. It should be noted, however, that the following examples are only illustrative and not intended to limit the invention thereto.

The respective components used in the following Examples and Comparative Examples are as follows.

Rubber Component (A):
  A-1: Styrene-butadiene rubber "JSR1500" (available from JSR Corp.);
    Weight-average molecular weight: 450,000;
    Styrene content: 23.5% by mass (produced by emulsion polymerization method)
  A-2: Butadiene rubber "BR01" (available from JSR Corp.);
    Weight-average molecular weight: 550,000;
    Cis isomer content: 95% by mass
  A-3: Natural rubber "SMR20" (natural rubber from Malaysia)
Polymer (B):
  Polyfarnesenes (B-1) to (B-4) and (B-5) to (B-7) produced in Production Examples 1 to 4 and 6 to 8
Silica (C):
  C-1: "ULTRASIL 7000GR" (wet silica; average particle size: 14 nm) (available from Evonik Degussa Japan Co., Ltd.)
  C-2: "AEROSIL 300" (dry silica; average particle size: 7 nm) (available from Nippon Aerosil Co., Ltd.)
  C-3: "NIPSIL E-74P" (wet silica; average particle size: 74 nm) (available from Tosoh Silica Corp.)
Carbon Black (D):
  D-1: "DIABLACK H" (available from Mitsubishi Chemical Corp.) (average particle size: 30 nm)
  D-2: "DIABLACK E" (available from Mitsubishi Chemical Corp.) (average particle size: 50 nm)
  D-3: "DIABLACK I" (available from Mitsubishi Chemical Corp.) (average particle size: 20 nm)
  D-4: "SEAST V" (available from Tokai Carbon Co., Ltd.) (average particle size: 60 nm)
Optional Components
Polyisoprene: Polyisoprene (X-1) produced in Production Example 5
  Polyisoprene (X-2) produced in Production Example 9
TDAE: "VivaTec500" (available from H & R Corp.)
Stearic Acid: "LUNAC S-20" (available from Kao Corp.)
Silane coupling reagent: "Si75" (available from Evonik Degussa Japan Co., Ltd.)
Zinc oxide: Zinc oxide (available from Sakai Chemical Industry Co., Ltd.)
Antioxidant (1): NOCRAC 6C" (available from Ouchi Shinko Chemical Industrial Co., Ltd.)
Antioxidant (2): "ANTAGE RD" (available from Kawaguchi Chemical Industry Co., Ltd.)
Sulfur: Sulfur fine powder; 200 mesh (available from Tsurumi Chemical Industry Co., Ltd.)
Vulcanization accelerator (1) "NOCCELER CZ-G" (available from Ouchi Shinko Chemical Industrial Co., Ltd.)
Vulcanization accelerator (2): "NOCCELER D" (available from Ouchi Shinko Chemical Industrial Co., Ltd.)
Vulcanization accelerator (3): "NOCCELER TBT-N" (available from Ouchi Shinko Chemical Industrial Co., Ltd.)
Vulcanization accelerator (4): "NOCCELER NS-P" (available from Ouchi Shinko Chemical Industrial Co., Ltd.)

Production Example 1

Production of Polyfarnesene (B-1)

A pressure reaction vessel previously purged with nitrogen and then dried was charged with 1070 g of hexane and 11.5 g of n-butyl lithium (in the form of a 17% by mass hexane solution). The contents of the reaction vessel were heated to 50° C., and 1755 g of β-farnesene was added thereto and polymerized for 1 h. The resulting polymerization reaction solution was mixed with methanol and then washed with water. After separating water from the polymerization reaction solution, the resulting solution was dried at 70° C. for 12 h, thereby obtaining a polyfarnesene (B-1) having properties shown in Table 1.

Production Example 2

Production of Polyfarnesene (B-2)

A pressure reaction vessel previously purged with nitrogen and then dried was charged with 900 g of cyclohexane and 164.4 g of sec-butyl lithium (in the form of a 10.5% by mass cyclohexane solution). The contents of the reaction vessel were heated to 50° C., and 1785 g of β-farnesene was added thereto and polymerized for 1 h. The resulting polymerization reaction solution was mixed with methanol and then washed with water. After separating water from the polymerization reaction solution, the resulting solution was dried at 70° C. for 12 h, thereby obtaining a polyfarnesene (B-2) having properties shown in Table 1.

Production Example 3

Production of Polyfarnesene (B-3)

A pressure reaction vessel previously purged with nitrogen and then dried was charged with 1370 g of hexane and 5.8 g of n-butyl lithium (in the form of a 17% by mass hexane solution). The contents of the reaction vessel were heated to 50° C., and 1359 g of β-farnesene was added thereto and polymerized for 1 h. The resulting polymerization reaction solution was mixed with methanol and then washed with water. After separating water from the polymerization reaction solution, the resulting solution was dried at 70° C. for 12 h, thereby obtaining a polyfarnesene (B-3) having properties shown in Table 1.

Production Example 4

Production of Polyfarnesene (B-4)

A pressure reaction vessel previously purged with nitrogen and then dried was charged with 313 g of hexane and 0.7 g of n-butyl lithium (in the form of a 17% by mass cyclohexane solution). The contents of the reaction vessel were heated to 50° C., and 226 g of β-farnesene was added thereto and polymerized for 1 h. The resulting polymerization reaction solution was mixed with methanol and then washed with water. After separating water from the polymerization reaction solution, the resulting solution was dried at 70° C. for 12 h, thereby obtaining a polyfarnesene (B-4) having properties shown in Table 1.

Production Example 5

Production of Polyisoprene (X-1)

A pressure reaction vessel previously purged with nitrogen and then dried was charged with 600 g of hexane and 44.9 g of n-butyl lithium (in the form of a 17% by mass hexane solution). The contents of the reaction vessel were heated to 70° C., and 2050 g of isoprene was added thereto and polymerized for 1 h. The resulting polymerization reaction solution was mixed with methanol and then washed with water. After separating water from the polymerization reaction solution, the resulting solution was dried at 70° C. for 12 h, thereby obtaining a polyisoprene (X-1) having properties shown in Table 1.

Production Example 6

Production of Polyfarnesene (B-5)

A pressure reaction vessel previously purged with nitrogen and then dried was charged with 274 g of hexane as a solvent and 1.2 g of n-butyl lithium (in the form of a 17% by mass hexane solution) as an initiator. The contents of the reaction vessel were heated to 50° C., and 272 g of β-farnesene was added thereto and polymerized for 1 h. Successively, the resulting polymerization reaction solution was treated with methanol and then washed with water. After separating water from the thus washed polymerization reaction solution, the resulting solution was dried at 70° C. for 12 h, thereby obtaining a polyfarnesene (B-5). Various properties of the thus obtained polyfarnesene (B-5) are shown in Table 1.

Production Example 7

Production of Polyfarnesene (B-6)

A pressure reaction vessel previously purged with nitrogen and then dried was charged with 240 g of cyclohexane as a solvent and 1.7 g of n-butyl lithium (in the form of a 17% by mass hexane solution) as an initiator. The contents of the reaction vessel were heated to 50° C., and 0.5 g of N,N,N',N'-tetramethyl ethylenediamine and further 340 g of β-farnesene were added thereto and polymerized for 1 h. Successively, the resulting polymerization reaction solution was treated with methanol and then washed with water. After separating water from the thus washed polymerization reaction solution, the resulting solution was dried at 70° C. for 12 h, thereby obtaining a polyfarnesene (B-6). Various properties of the thus obtained polyfarnesene (B-6) are shown in Table 1.

Production Example 8

Production of Polyfarnesene (B-7)

A pressure reaction vessel was charged with 500 g of polyfarnesene produced by the same method as described in Production Example 6, 0.5 g of "NOCRAC 6C" as an antioxidant, and 2.5 g of maleic anhydride. After purging the reaction vessel with nitrogen, the contents of the reaction vessel were heated to 170° C. and reacted at that temperature for 10 h, thereby obtaining a polyfarnesene (B-7). Various properties of the thus obtained polyfarnesene (B-7) are shown in Table 1.

Production Example 9

Production of Polyisoprene (X-2)

A pressure reaction vessel previously purged with nitrogen and then dried was charged with 600 g of hexane and 13.9 g of n-butyl lithium (in the form of a 17% by mass hexane solution). The contents of the reaction vessel were heated to 70° C., and 1370 g of isoprene was added thereto and polymerized for 1 h. The resulting polymerization reaction solution was mixed with methanol and then washed with water. After separating water from the polymerization reaction solution, the resulting solution was dried at 70° C. for 12 h, thereby obtaining a polyisoprene (X-2). Various properties of the thus obtained polyisoprene (X-2) are shown in Table 1.

Meanwhile, the weight-average molecular weight and melt viscosity of each of the polymer (B) and polyisoprene were measured by the following methods.

(Method of Measuring Weight-Average Molecular Weight)

The weight-average molecular weight (Mw) and the molecular weight distribution (Mw/Mn) of each of the polymer (B) and polyisoprene were measured by GPC (gel permeation chromatography) in terms of a molecular weight of polystyrene as a reference standard substance. The measuring apparatuses and measuring conditions are as follows.

Apparatus: GPC device "GPC8020" available from Tosoh Corp.
Separating column: "TSKgelG4000HXL" available from Tosoh Corp.
Detector: "RI-8020" available from Tosoh Corp.
Eluent: Tetrahydrofuran
Eluent flow rate: 1.0 mL/min
Sample concentration: 5 mg/10 mL
Column temperature: 40° C.

(Method of Measuring Melt Viscosity)

The melt viscosity of the polymer (B) was measured at 38° C. using a Brookfield viscometer available from Brookfield Engineering Labs. Inc.

(Method of Measuring Vinyl Content)

A solution prepared by dissolving 50 mg of the polymer (B) in 1 mL of $CDCl_3$ was subjected to $^1H$-NMR measurement at 400 MHz at a cumulative frequency of 512 times. In the chart obtained by the above measurement, a spectrum portion in the range of from 4.94 to 5.22 ppm was regarded as being a spectrum derived from a vinyl structure, whereas a spectrum portion in the range of from 4.45 to 4.85 ppm was regarded as being a combined spectrum derived from both the vinyl structure and a 1,4-bond, and the vinyl content of the polymer (B) was calculated according to the following formula.

{Vinyl content}=(integrated value from 4.94 to 5.22 ppm)/2/{(integrated value from 4.94 to 5.22 ppm)/2+[(integrated value from 4.45 to 4.85 ppm)−(integrated value from 4.94 to 5.22 ppm)]/3}

(Method of Measuring Glass Transition Temperature)

Ten milligrams of the polymer (B) were sampled in an aluminum pan, and a thermogram of the sample was measured at temperature rise rate of 10° C./min by differential scanning calorimetry (DSC), and the value at a peak top observed in the DDSC curve was determined and defined as a glass transition temperature of the polymer (B).

TABLE 1

| | Polymer | Weight-average molecular weight (×10³) | Molecular weight distribution Mw/Mn | Vinyl content (mol %) | Glass transition temperature (° C.) | Melt viscosity (at 38° C.) (Pa·s) |
|---|---|---|---|---|---|---|
| Production Example 1 | Polyfarnesene (B-1) | 100 | 1.2 | 7 | −73 | 32 |
| Production Example 2 | Polyfarnesene (B-2) | 9 | 1.1 | 8 | −73 | 0.7 |
| Production Example 3 | Polyfarnesene (B-3) | 180 | 1.2 | 7 | −73 | 180 |
| Production Example 4 | Polyfarnesene (B-4) | 430 | 1.5 | 7 | −73 | 2200 |
| Production Example 5 | Polyisoprene (X-1) | 32 | 1.1 | — | — | 74 |
| Production Example 6 | Polyfarnesene (B-5) | 140 | 1.1 | 7 | −73 | 65 |
| Production Example 7 | Polyfarnesene (B-6) | 100 | 1.1 | 50 | −66 | 62 |
| Production Example 8 | Polyfarnesene (B-7) | 140 | 1.2 | 7 | −71 | 90 |
| Production Example 9 | Polyisoprene (X-2) | 60 | 1.1 | — | — | 480 |

Examples 1 to 5 and Comparative Examples 1 to 3

The rubber component (A), polymer (B), silica (C), carbon black (D), polyisoprene, silane coupling reagent, TDAE, stearic acid, zinc oxide and antioxidant were respectively charged at such a compounding ratio (part(s) by mass) as shown in Table 2 into a closed type Banbury mixer and kneaded together for 6 min such that the initiating temperature was 75° C. and the resin temperature reached 160° C. The resulting mixture was once taken out of the mixer, and cooled to room temperature. Next, the mixture was placed in a mixing roll, and after adding sulfur and the vulcanization accelerator thereto, the contents of the mixing roll were kneaded at 60° C. for 6 min, thereby obtaining a rubber composition. The Mooney viscosity of the thus obtained rubber composition was measured by the below-mentioned method.

In addition, the resulting rubber composition was press-molded (at 145° C. for 20 to 40 min) to prepare a sheet (thickness: 2 mm). The thus prepared sheet was evaluated for a rolling resistance performance, a hardness and a tensile strength at break by the below-mentioned methods. The results are shown in Table 2.

Meanwhile, the method of measuring and evaluating the respective properties are as follows.

(1) Mooney Viscosity

As an index of a processability of the rubber composition, the Mooney viscosity (ML1+4) of the rubber composition before being cured was measured at 100° C. according to JIS K6300. The values of the respective Examples and Comparative Examples are relative values based on 100 as the value of Comparative Example 3. Meanwhile, the smaller Mooney viscosity value indicates a more excellent processability.

(2) Rolling Resistance Performance

The sheet of the rubber composition prepared in the respective Examples and Comparative Examples was cut into a test piece having a size of 40 mm in length×7 mm in width. The thus obtained test piece was subjected to measurement of tan δ as an index of a rolling resistance performance of the rubber composition using a dynamic viscoelasticity measuring apparatus available from GABO GmbH under the conditions including a measuring temperature of 60° C., a frequency of 10 Hz, a static distortion of 10% and a dynamic distortion of 2%. The values of the respective Examples and Comparative Examples are relative values based on 100 as the value of Comparative Example 3. Meanwhile, the smaller value indicates a excellent rolling resistance performance of the rubber composition.

(3) Hardness

The hardness of the sheet of the rubber composition prepared in the respective Examples and Comparative Examples was measured using a type-A hardness tester according to JIS K6253, and the thus measured hardness was used as an index of a flexibility of the rubber composition. Meanwhile, when the hardness value is less than 50, a tire produced from the rubber composition suffers from large deformation and therefore is deteriorated in steering stability.

(4) Tensile Strength at Break

The sheet of the rubber composition prepared in the respective Examples and Comparative Examples was punched into a dumbbell-shaped test piece according to JIS 3, and the obtained test piece was subjected to measurement of a tensile strength at break thereof using a tensile tester available from Instron Corp. The values of the respective Examples and Comparative Examples are relative values based on 100 as the value of Comparative Example 3. Meanwhile, the larger value indicates a higher tensile strength at break of the rubber composition.

TABLE 2

| | Examples | | | | | Comparative Examples | | |
|---|---|---|---|---|---|---|---|---|
| | 1 | 2 | 3 | 4 | 5 | 1 | 2 | 3 |
| Compounding ratio (part(s) by mass) | | | | | | | | |
| Component (A) | | | | | | | | |
| Styrene-butadiene rubber | 100 | 100 | 100 | 100 | 100 | 100 | 100 | 100 |
| Component (B) | | | | | | | | |

TABLE 2-continued

|  | Examples | | | | | Comparative Examples | | |
| --- | --- | --- | --- | --- | --- | --- | --- | --- |
|  | 1 | 2 | 3 | 4 | 5 | 1 | 2 | 3 |
| Polyfarnesene (B-1) | 10 |  |  |  | 10 |  |  |  |
| Polyfarnesene (B-2) |  | 10 |  |  |  |  |  |  |
| Polyfarnesene (B-3) |  |  | 10 |  |  |  |  |  |
| Polyfarnesene (B-4) |  |  |  | 10 |  |  |  |  |
| Polyisoprene (X-1) |  |  |  |  |  | 10 |  |  |
| TDAE |  |  |  |  |  |  | 10 |  |
| Component (C) |  |  |  |  |  |  |  |  |
| Silica (C-1) | 25 | 25 | 25 | 25 | 25 | 25 | 25 | 25 |
| Silica (C-2) |  |  |  |  |  |  |  |  |
| Silica (C-3) |  |  |  |  |  |  |  |  |
| Component (D) |  |  |  |  |  |  |  |  |
| Carbon black (D-1) | 25 | 25 | 25 | 25 |  | 25 | 25 | 25 |
| Carbon black (D-2) |  |  |  |  | 25 |  |  |  |
| Optional Components |  |  |  |  |  |  |  |  |
| Stearic acid | 1 | 1 | 1 | 1 | 1 | 1 | 1 | 1 |
| Silane coupling reagent | 2 | 2 | 2 | 2 | 2 | 2 | 2 | 2 |
| Zinc oxide | 3.5 | 3.5 | 3.5 | 3.5 | 3.5 | 3.5 | 3.5 | 3.5 |
| Antioxidant (1) | 1 | 1 | 1 | 1 | 1 | 1 | 1 | 1 |
| Antioxidant (2) | 1 | 1 | 1 | 1 | 1 | 1 | 1 | 1 |
| Sulfur | 1.5 | 1.5 | 1.5 | 1.5 | 1.5 | 1.5 | 1.5 | 1.5 |
| Vulcanization accelerator (1) | 0.4 | 0.4 | 0.4 | 0.4 | 0.4 | 0.4 | 0.4 | 0.4 |
| Vulcanization accelerator (2) | 0.3 | 0.3 | 0.3 | 0.3 | 0.3 | 0.3 | 0.3 | 0.3 |
| Vulcanization accelerator (3) | 1.2 | 1.2 | 1.2 | 1.2 | 1.2 | 1.2 | 1.2 | 1.2 |
| Properties |  |  |  |  |  |  |  |  |
| Mooney viscosity (relative value) | 73 | 67 | 74 | 78 | 68 | 70 | 71 | 100 |
| Rolling resistance performance (at 60° C.; tanδ) (relative value) | 92 | 103 | 91 | 94 | 88 | 105 | 105 | 100 |
| Hardness (type A) | 65 | 60 | 64 | 67 | 61 | 60 | 60 | 67 |
| Tensile strength at break (relative value) | 102 | 101 | 98 | 103 | 97 | 105 | 106 | 100 |

The rubber compositions obtained in Examples 1 to 5 exhibited a low Mooney viscosity and therefore a good processability. In addition, the rubber compositions obtained in Examples 1, 3, 4 and 5 exhibited a low rolling resistance performance. In particular, the rubber compositions obtained in Examples 1, 3 and 4 were prevented from suffering from deterioration in mechanical strength and hardness, and therefore could be suitably used as a rubber composition for tires.

Examples 6 to 26 and Comparative Examples 4 to 16

The rubber component (A), polymer (B), silica (C), carbon black (D), polyisoprene, silane coupling reagent, TDAE, stearic acid, zinc oxide and antioxidant were respectively charged at such a compounding ratio (part(s) by mass) as shown in Tables 3 to 5 into a closed type Banbury mixer and kneaded together for 6 min such that the initiating temperature was 75° C. and the resin temperature reached 160° C. The resulting mixture was once taken out of the mixer, and cooled to room temperature. Next, the mixture was placed in a mixing roll, and after adding sulfur and the vulcanization accelerator thereto, the contents of the mixing roll were kneaded at 60° C. for 6 min, thereby obtaining a rubber composition. The Mooney viscosity of the thus obtained rubber composition was measured by the above-mentioned method.

In addition, the resulting rubber composition was press-molded (at 145° C. for 10 to 45 min) to prepare a sheet (thickness: 2 mm). The thus prepared sheet was evaluated for a rolling resistance performance and a hardness by the above-mentioned methods. The results are shown in Tables 3 to 5.

Meanwhile, the values of the Mooney viscosity and rolling resistance performance in the respective Examples and Comparative Examples are relative values based on 100 as each value of Comparative Example 3 shown in Table 2.

TABLE 3

|  | Examples | | | | | | | | | | |
| --- | --- | --- | --- | --- | --- | --- | --- | --- | --- | --- | --- |
|  | 6 | 7 | 8 | 9 | 10 | 11 | 12 | 13 | 14 | 15 | 16 |
| Compounding ratio (part(s) by mass) | | | | | | | | | | | |
| Component (A) | | | | | | | | | | | |
| Styrene-butadiene rubber | 100 | 100 | 100 | 100 | 100 | 70 | 70 | 100 | 70 | 70 | 70 |
| Butadiene rubber |  |  |  |  |  | 30 |  |  | 30 | 30 | 30 |
| Natural rubber |  |  |  |  |  |  | 30 |  |  |  |  |

TABLE 3-continued

| Component (B) | | | | | | | | | | | |
|---|---|---|---|---|---|---|---|---|---|---|---|
| Polyfarnesene (B-1) | 15 | 20 | 10 | 10 | 10 | 10 | 10 | 10 | 6 | 6 | 4 |
| Polyfarnesene (B-2) | | | | | 10 | | | | | | |
| Polyisoprene (X-1) | | | 10 | | | | | | | | |
| TDAE | | | | 10 | | | | | | | 4 |
| Component (C) | | | | | | | | | | | |
| Silica (C-1) | 25 | 25 | 25 | 25 | 25 | 25 | 25 | 20 | 25 | 25 | 25 |
| Component (D) | | | | | | | | | | | |
| Carbon black (D-1) | 25 | 25 | 25 | 25 | 25 | 25 | 25 | 20 | 25 | 21 | 25 |
| Optional Components | | | | | | | | | | | |
| Stearic acid | 1 | 1 | 1 | 1 | 1 | 1 | 1 | 1 | 1 | 1 | 1 |
| Silane coupling reagent | 2 | 2 | 2 | 2 | 2 | 2 | 2 | 1.6 | 2 | 2 | 2 |
| Zinc oxide | 3.5 | 3.5 | 3.5 | 3.5 | 3.5 | 3.5 | 3.5 | 3.5 | 3.5 | 3.5 | 3.5 |
| Antioxidant (1) | 1 | 1 | 1 | 1 | 1 | 1 | 1 | 1 | 1 | 1 | 1 |
| Antioxidant (2) | 1 | 1 | 1 | 1 | 1 | 1 | 1 | 1 | 1 | 1 | 1 |
| Sulfur | 1.5 | 1.5 | 1.5 | 1.5 | 1.5 | 1.5 | 1.5 | 1.5 | 1.5 | 1.5 | 1.5 |
| Vulcanization accelerator (1) | 0.4 | 0.4 | 0.4 | 0.4 | 0.4 | 0.4 | 0.4 | 0.4 | 0.4 | 0.4 | 0.4 |
| Vulcanization accelerator (2) | 0.3 | 0.3 | 0.3 | 0.3 | 0.3 | 0.3 | 0.3 | 0.3 | 0.3 | 0.3 | 0.3 |
| Vulcanization accelerator (3) | 1.2 | 1.2 | 1.2 | 1.2 | 1.2 | 1.2 | 1.2 | 1.2 | 1.2 | 1.2 | 1.2 |
| Properties | | | | | | | | | | | |
| Mooney viscosity (relative value) | 65 | 55 | 54 | 54 | 50 | 70 | 66 | 63 | 82 | 74 | 74 |
| Rolling resistance performance (at 60° C.; tanδ) (relative value) | 98 | 99 | 102 | 101 | 106 | 95 | 91 | 87 | 95 | 90 | 96 |
| Hardness (type A) | 59 | 57 | 56 | 56 | 53 | 61 | 58 | 58 | 62 | 60 | 61 |

| | Comparative Examples | | | | | |
|---|---|---|---|---|---|---|
| | 4 | 5 | 6 | 7 | 8 | 9 |
| Compounding ratio (part(s) by mass) | | | | | | |
| Component (A) | | | | | | |
| Styrene-butadiene rubber | 100 | 70 | 70 | 100 | 70 | 70 |
| Butadiene rubber | | 30 | | | 30 | 30 |
| Natural rubber | | | 30 | | | |
| Component (B) | | | | | | |
| Polyfarnesene (B-1) | | | | | | |
| Polyfarnesene (B-2) | | | | | | |
| Polyisoprene (X-1) | | | | | | 4 |
| TDAE | 20 | 10 | 10 | 10 | 6 | 4 |
| Component (C) | | | | | | |
| Silica (C-1) | 25 | 25 | 25 | 20 | 25 | 25 |
| Component (D) | | | | | | |
| Carbon black (D-1) | 25 | 25 | 25 | 20 | 25 | 25 |
| Optional Components | | | | | | |
| Stearic acid | 1 | 1 | 1 | 1 | 1 | 1 |
| Silane coupling reagent | 2 | 2 | 2 | 1.6 | 2 | 2 |
| Zinc oxide | 3.5 | 3.5 | 3.5 | 3.5 | 3.5 | 3.5 |
| Antioxidant (1) | 1 | 1 | 1 | 1 | 1 | 1 |
| Antioxidant (2) | 1 | 1 | 1 | 1 | 1 | 1 |
| Sulfur | 1.5 | 1.5 | 1.5 | 1.5 | 1.5 | 1.5 |
| Vulcanization accelerator (1) | 0.4 | 0.4 | 0.4 | 0.4 | 0.4 | 0.4 |
| Vulcanization accelerator (2) | 0.3 | 0.3 | 0.3 | 0.3 | 0.3 | 0.3 |
| Vulcanization accelerator (3) | 1.2 | 1.2 | 1.2 | 1.2 | 1.2 | 1.2 |

TABLE 3-continued

| Properties | | | | | | |
|---|---|---|---|---|---|---|
| Mooney viscosity (relative value) | 50 | 64 | 66 | 58 | 75 | 75 |
| Rolling resistance performance (at 60° C.; tanδ) (relative value) | 108 | 99 | 99 | 92 | 96 | 97 |
| Hardness (type A) | 51 | 58 | 55 | 54 | 60 | 60 |

The rubber compositions obtained in Examples 6 to 13 exhibited a low Mooney viscosity and therefore a good processability, and further were prevented from suffering from deterioration in hardness. In addition, the rubber compositions exhibited a low rolling resistance performance, and therefore could be suitably used as a rubber composition for tires.

In addition, from the comparison between Examples 8 to 10 and Comparative Example 4, it was confirmed that even when using two or more kinds of polymers (B) or using the polymer (B) in combination with the other optional components, it was also possible to obtain the rubber compositions having an excellent rolling resistance performance without deterioration in hardness thereof.

Furthermore, from the comparison between Example 11 and Comparative Example 5, between Example 12 and Comparative Example 6, between Example 14 or 15 and Comparative Example 8, and between Example 16 and Comparative Example 9, it was confirmed that even when using two or more kinds of rubber components (A), it was also possible to obtain the rubber compositions having an excellent rolling resistance performance without deterioration in hardness thereof.

TABLE 4

| | Examples | | | | | | | Comparative Examples | | | |
|---|---|---|---|---|---|---|---|---|---|---|---|
| | 17 | 18 | 19 | 20 | 21 | 22 | 23 | 10 | 11 | 12 | 13 |
| Compounding ratio (part(s) by mass) | | | | | | | | | | | |
| Component (A) | | | | | | | | | | | |
| Styrene-butadiene rubber | 100 | 100 | 100 | 100 | 100 | 100 | 100 | 100 | 100 | 100 | 100 |
| Component (B) | | | | | | | | | | | |
| Polyfarnesene (B-1) | | | | | | 10 | 10 | | | | |
| Polyfarnesene (B-5) | 1 | 3 | 10 | | | | | | | | |
| Polyfarnesene (B-6) | | | | 10 | | | | | | | |
| Maleic acid-modified polyfarnesene (B-7) | | | | | 10 | | | | | | |
| Polyisoprene (X-2) | | | | | | | | | | | 10 |
| TDAE | | | | | | | | 1 | 3 | 10 | |
| Component (C) | | | | | | | | | | | |
| Silica (C-1) | 25 | 25 | 25 | 25 | 25 | 25 | 25 | 25 | 25 | 25 | 25 |
| Component (D) | | | | | | | | | | | |
| Carbon black (D-1) | 25 | 25 | 25 | 25 | 25 | 25 | 25 | 25 | 25 | 21 | 25 |
| Optional Components | | | | | | | | | | | |
| Stearic acid | 1 | 1 | 1 | 1 | 1 | 1 | 1 | 1 | 1 | 1 | 1 |
| Silane coupling reagent | 2 | 2 | 2 | 2 | 2 | 2.5 | 1.5 | 2 | 2 | 2 | 2 |
| Zinc oxide | 3.5 | 3.5 | 3.5 | 3.5 | 3.5 | 3.5 | 3.5 | 3.5 | 3.5 | 3.5 | 3.5 |
| Antioxidant (1) | 1 | 1 | 1 | 1 | 1 | 1 | 1 | 1 | 1 | 1 | 1 |
| Antioxidant (2) | 1 | 1 | 1 | 1 | 1 | 1 | 1 | 1 | 1 | 1 | 1 |
| Sulfur | 1.5 | 1.5 | 1.5 | 1.5 | 1.5 | 1.5 | 1.5 | 1.5 | 1.5 | 1.5 | 1.5 |
| Vulcanization accelerator (1) | 0.4 | 0.4 | 0.4 | 0.4 | 0.4 | 0.4 | 0.4 | 0.4 | 0.4 | 0.4 | 0.4 |
| Vulcanization accelerator (2) | 0.3 | 0.3 | 0.3 | 0.3 | 0.3 | 0.3 | 0.3 | 0.3 | 0.3 | 0.3 | 0.3 |
| Vulcanization accelerator (3) | 1.2 | 1.2 | 1.2 | 1.2 | 1.2 | 1.2 | 1.2 | 1.2 | 1.2 | 1.2 | 1.2 |

TABLE 4-continued

|  | Examples | | | | | | | Comparative Examples | | | |
| --- | --- | --- | --- | --- | --- | --- | --- | --- | --- | --- | --- |
|  | 17 | 18 | 19 | 20 | 21 | 22 | 23 | 10 | 11 | 12 | 13 |
| Properties | | | | | | | | | | | |
| Mooney viscosity (relative value) | 94 | 90 | 75 | 77 | 80 | 75 | 76 | 92 | 86 | 71 | 74 |
| Rolling resistance performance (at 60° C.; tanδ) (relative value) | 100 | 100 | 96 | 98 | 95 | 96 | 99 | 101 | 103 | 105 | 105 |
| Hardness (type A) | 68 | 71 | 65 | 71 | 67 | 68 | 66 | 68 | 71 | 65 | 66 |

From the comparison between Example 17 and Comparative Example 10, between Example 18 and Comparative Example 11 and between Example 19 and Comparative Example 12, it was confirmed that when using the polymer (B) in an amount of 0.1 part by mass or more on the basis of 100 parts by mass of the rubber component (A), it was possible to obtain the rubber compositions having a good processability and an excellent rolling resistance performance which were prevented from suffering from deterioration in hardness thereof.

From the comparison between Example 20 or 21 and Comparative Example 12 or 13, it was confirmed that even when using the modified or vinylated polymer (B), it was also possible to attain the effects of the present invention.

Furthermore, from Example 22 or 23, it was confirmed that even when compounding the silane coupling reagent in an amount of from 0.1 to 30 parts by mass on the basis of 100 parts by mass of the silica (C), it was also possible to obtain the rubber composition having an excellent rolling resistance performance without deterioration in hardness thereof.

TABLE 5

|  | Examples | | | Comparative Examples | | |
| --- | --- | --- | --- | --- | --- | --- |
|  | 24 | 25 | 26 | 14 | 15 | 16 |
| Compounding ratio (part(s) by mass) | | | | | | |
| Component (A) | | | | | | |
| Styrene-butadiene rubber | 100 | 100 | 100 | 100 | 100 | 100 |
| Component (B) | | | | | | |
| Polyfarnesene (B-5) | 50 | 30 | 10 | | | |
| TDAE | | | | 50 | 30 | 10 |
| Component (C) | | | | | | |
| Silica (C-1) | | 80 | | | 80 | |
| Silica (C-2) | | | 5 | | | 5 |
| Silica (C-3) | 1 | | | 1 | | |
| Component (D) | | | | | | |
| Carbon black (D-1) | 80 | | | 80 | | |
| Carbon black (D-2) | | | | | | |
| Carbon black (D-3) | | 45 | | | 45 | |
| Carbon black (D-4) | | | 1 | | | 1 |
| Optional Components | | | | | | |
| Stearic acid | 1 | 1 | 1 | 1 | 1 | 1 |
| Silane coupling reagent | 0.08 | 6.4 | 0.4 | 2 | 2 | 2 |
| Zinc oxide | 3.5 | 3.5 | 3.5 | 3.5 | 3.5 | 3.5 |
| Antioxidant (1) | 1 | 1 | 1 | 1 | 1 | 1 |
| Antioxidant (2) | 1 | 1 | 1 | 1 | 1 | 1 |
| Sulfur | 1.5 | 1.5 | 1.5 | 1.5 | 1.5 | 1.5 |

TABLE 5-continued

|  | Examples | | | Comparative Examples | | |
| --- | --- | --- | --- | --- | --- | --- |
|  | 24 | 25 | 26 | 14 | 15 | 16 |
| Vulcanization accelerator (1) | 0.4 | 0.4 | 0.4 | 0.4 | 0.4 | 0.4 |
| Vulcanization accelerator (2) | 0.3 | 0.3 | 0.3 | 0.3 | 0.3 | 0.3 |
| Vulcanization accelerator (3) | 1.2 | 1.2 | 1.2 | 1.2 | 1.2 | 1.2 |
| Properties | | | | | | |
| Mooney viscosity (relative value) | 41 | 74 | 71 | 37 | 58 | 71 |
| Rolling resistance performance (at 60° C.; tanδ) (relative value) | 158 | 127 | 107 | 165 | 133 | 123 |
| Hardness (type A) | 59 | 71 | 63 | 55 | 66 | 63 |

From the comparison between Example 24 and Comparative Example 14, between Example 25 and Comparative Example 15 and between Example 26 and Comparative Example 16, it was confirmed that when compounding the polymer (B) in an amount of 100 parts by mass or less, the silica (C) in an amount of from 0.1 to 150 parts by mass and the carbon black (D) in an amount of from 0.1 to 150 parts by mass all on the basis of 100 parts by mass of the rubber component (A), it was possible to obtain the rubber compositions having an excellent rolling resistance performance which were prevented from suffering from deterioration in hardness thereof. In addition, it was confirmed that when using the silica (C) having an average particle size of from 0.5 to 200 nm or the carbon black (D) having an average particle size of from 5 to 100 nm, it was also possible to attain the effects of the present invention.

Examples 27 to 30 and Comparative Examples 17 to 19

The rubber component (A), polymer (B), silica (C), polyisoprene, silane coupling reagent, TDAE, stearic acid, zinc oxide and antioxidant were respectively charged at such a compounding ratio as shown in Table 6 into a closed type Banbury mixer and kneaded together for 6 min such that the initiating temperature was 75° C. and the resin temperature reached 160° C. The resulting mixture was taken out of the mixer, and cooled to room temperature. Next, the mixture was placed in a mixing roll, and after adding sulfur and the vulcanization accelerator thereto, the contents of the mixing roll were kneaded at 60° C. for 6 min, thereby obtaining a rubber composition. The Mooney viscosity of the thus obtained rubber composition was measured by the below-mentioned method.

In addition, the resulting rubber composition was press-molded (at 145° C. for 20 to 40 min) to prepare a sheet (thickness: 2 mm). The thus prepared sheet was evaluated for a rolling resistance performance and a hardness by the below-mentioned methods. The results are shown in Table 6.

(1) Mooney Viscosity

As an index of a processability of the rubber composition, the Mooney viscosity (ML1+4) of the rubber composition before being cured was measured at 100° C. according to JIS K6300. The values of the respective Examples and Comparative Examples as shown in Table 6 are relative values based on 100 as the value of Comparative Example 19. Meanwhile, the smaller Mooney viscosity value indicates a more excellent processability.

(2) Rolling Resistance Performance

The sheet of the rubber composition prepared in the respective Examples and Comparative Examples was cut into a test piece having a size of 40 mm in length×7 mm in width. The thus obtained test piece was subjected to measurement of tan δ as an index of a rolling resistance performance of the rubber composition using a dynamic viscoelasticity measuring apparatus available from GABO GmbH under the conditions including a measuring temperature of 60° C., a frequency of 10 Hz, a static distortion of 10% and a dynamic distortion of 2%. The values of the respective Examples and Comparative Examples are relative values based on 100 as the value of Comparative Example 19. Meanwhile, the smaller value indicates a higher rolling resistance performance of the rubber composition.

(3) Hardness

The hardness of the sheet of the rubber composition prepared in the respective Examples and Comparative Examples was measured using a type-A hardness tester according to JIS K6253, and the thus measured hardness was used as an index of a flexibility of the rubber composition. Meanwhile, when the hardness value is less than 50, a tire produced from the rubber composition suffers from large deformation and therefore is deteriorated in steering stability.

TABLE 6

|  | Examples | | | | Comparative Examples | | |
| --- | --- | --- | --- | --- | --- | --- | --- |
|  | 27 | 28 | 29 | 30 | 17 | 18 | 19 |
| Compounding ratio (part(s) by mass) | | | | | | | |
| Component (A) | | | | | | | |
| Styrene-butadiene rubber | 100 | 100 | 100 | 100 | 100 | 100 | 100 |
| Component (B) | | | | | | | |
| Polyfarnesene (B-1) | 10 | | | | | | |
| Polyfarnesene (B-2) | | 10 | | | | | |
| Polyfarnesene (B-3) | | | 10 | | | | |
| Polyfarnesene (B-4) | | | | 10 | | | |
| Polyisoprene (X-1) | | | | | 10 | | |
| TDAE | | | | | | 10 | |
| Component (C) | | | | | | | |
| Silica (C-1) | 50 | 50 | 50 | 50 | 50 | 50 | 50 |
| Optional Components | | | | | | | |
| Stearic acid | 1 | 1 | 1 | 1 | 1 | 1 | 1 |
| Silane coupling reagent | 4 | 4 | 4 | 4 | 4 | 4 | 4 |
| Zinc oxide | 3.5 | 3.5 | 3.5 | 3.5 | 3.5 | 3.5 | 3.5 |
| Antioxidant (1) | 1 | 1 | 1 | 1 | 1 | 1 | 1 |
| Antioxidant (2) | 1 | 1 | 1 | 1 | 1 | 1 | 1 |
| Sulfur | 1.5 | 1.5 | 1.5 | 1.5 | 1.5 | 1.5 | 1.5 |
| Vulcanization accelerator (1) | 0.35 | 0.35 | 0.35 | 0.35 | 0.35 | 0.35 | 0.35 |
| Vulcanization accelerator (2) | 0.5 | 0.5 | 0.5 | 0.5 | 0.5 | 0.5 | 0.5 |
| Vulcanization accelerator (3) | 1.5 | 1.5 | 1.5 | 1.5 | 1.5 | 1.5 | 1.5 |
| Properties | | | | | | | |
| Mooney viscosity (relative value) | 85 | 74 | 85 | 88 | 81 | 74 | 100 |
| Rolling resistance performance (at 60° C.; tanδ) (relative value) | 90 | 103 | 91 | 94 | 104 | 105 | 100 |
| Hardness (type A) | 67 | 62 | 67 | 68 | 63 | 61 | 68 |

The rubber compositions obtained in Examples 27 to 30 exhibited a low Mooney viscosity and a good processability. Furthermore, the rubber compositions obtained in Examples 27 to 30 exhibited a low rolling resistance performance and were prevented from suffering from deterioration in hardness even as compared with those of Comparative Examples 17 and 18. Among them, the rubber compositions obtained in Examples 27, 29 and 30 exhibited a good balance between a low rolling resistance and a high hardness, and therefore could be suitably used as a rubber composition for tires. On the other hand, the rubber composition obtained in Comparative Example 19 exhibited a high Mooney viscosity and was insufficient in processability.

Examples 31 and 32 and Comparative Examples 20 to 22

The rubber component (A), polymer (B), silica (C), polyisoprene, silane coupling reagent, TDAE, stearic acid, zinc oxide and antioxidant were respectively charged at such a compounding ratio (part(s) by mass) as shown in Table 7 into a closed type Banbury mixer and kneaded together for 6 min such that the initiating temperature was 75° C. and the resin temperature reached 160° C. The resulting mixture was taken out of the mixer, and cooled to room temperature. Next, the mixture was placed in a mixing roll, and after adding sulfur and the vulcanization accelerator thereto, the contents of the mixing roll were kneaded at 60° C. for 6 min, thereby obtaining a rubber composition. The Mooney viscosity of the thus obtained rubber composition was measured by the above-mentioned method.

In addition, the resulting rubber composition was press-molded (at 145° C. for 45 min) to prepare a sheet (thickness: 2 mm). The thus prepared sheet was evaluated for a rolling resistance performance and a hardness by the above-mentioned methods. The results are shown in Table 7.

Meanwhile, the values of the Mooney viscosity, rolling resistance performance and tensile strength at break in the respective Examples and Comparative Examples are relative values based on 100 as each value of Comparative Example 22 shown in Table 7.

TABLE 7

|  | Examples | | Comparative Examples | | |
|---|---|---|---|---|---|
|  | 31 | 32 | 20 | 21 | 22 |
| *Compounding ratio (part(s) by mass)* | | | | | |
| Component (A) | | | | | |
| Natural rubber | 100 | 100 | 100 | 100 | 100 |
| Component (B) | | | | | |
| Polyfarnesene (B-5) | 6 | | | | |
| Maleic acid-modified polyfarnesene (B-7) | | 6 | | | |
| Polyisoprene (X-2) | | | 6 | | |
| TDAE | | | | 6 | |
| Component (C) | | | | | |
| Silica (C-1) | 50 | 50 | 50 | 50 | 50 |
| Optional Components | | | | | |
| Stearic acid | 2 | 2 | 2 | 2 | 2 |
| Silane coupling reagent | 4 | 4 | 4 | 4 | 4 |
| Zinc oxide | 3.5 | 3.5 | 3.5 | 3.5 | 3.5 |
| Antioxidant (1) | 1 | 1 | 1 | 1 | 1 |
| Antioxidant (2) | 1 | 1 | 1 | 1 | 1 |
| Sulfur | 1.5 | 1.5 | 1.5 | 1.5 | 1.5 |
| Vulcanization accelerator (4) | 1.2 | 1.2 | 1.2 | 1.2 | 1.2 |
| *Properties* | | | | | |
| Mooney viscosity (relative value) | 86 | 94 | 87 | 90 | 100 |
| Rolling resistance performance (at 60° C.; tanδ) (relative value) | 93 | 94 | 108 | 96 | 100 |
| Hardness (type A) | 56 | 56 | 57 | 54 | 61 |
| Tensile strength at break (relative value) | 103 | 103 | 94 | 93 | 100 |

The rubber compositions obtained in Examples 31 and 32 exhibited a low Mooney viscosity and a good processability. Furthermore, the rubber compositions obtained in Examples 31 and 32 exhibited a low rolling resistance performance and were prevented from suffering from deterioration in mechanical strength and hardness even as compared with those of Comparative Examples 20 and 21, and therefore could be suitably used as a rubber composition for tires. On the other hand, the rubber composition obtained in Comparative Example 22 exhibited a high Mooney viscosity and was insufficient in processability.

The invention claimed is:

1. A rubber composition, comprising:
   a rubber component,
   a farnesene polymer and
   silica
   wherein a content of the polymer in the rubber composition is from 1 to 100 parts by mass.

2. The rubber composition according to claim 1, wherein the polymer is a homopolymer of β-farnesene.

3. The rubber composition according to claim 1, wherein the silica has an average particle size of from 0.5 to 200 nm.

4. The rubber composition according to claim 1, wherein the polymer has a melt viscosity of from 0.1 to 3,000 Pa·s, as measured at 38° C.

5. The rubber composition according to claim 1, wherein the polymer has a weight-average molecular weight of from 2,000 to 500,000.

6. The rubber composition according to claim 1, wherein a content of the polymer in the rubber composition is from 1 to 100 parts by mass, and
   a content of the silica in the rubber composition is from 0.1 to 150 parts by mass,
   both on the basis of 100 parts by mass of the rubber component.

7. The rubber composition according to claim 1, further comprising:
   carbon black.

8. The rubber composition according to claim 7, wherein the carbon black has an average particle size of from 5 to 100 nm.

9. The rubber composition according to claim 7, wherein a content of the polymer in the rubber composition is from 1 to 100 parts by mass,
   a content of the silica in the rubber composition is from 0.1 to 150 parts by mass, and
   a content of the carbon black in the rubber composition is from 0.1 to 150 parts by mass,
   all on the basis of 100 parts by mass of the rubber component.

10. The rubber composition according to claim 1, wherein the rubber component is at least one rubber selected from the group consisting of a styrene-butadiene rubber, a natural rubber, a butadiene rubber, and an isoprene rubber.

11. The rubber composition according to claim 10, wherein the styrene-butadiene rubber has a weight-average molecular weight of from 100,000 to 2,500,000.

12. The rubber composition according to claim 10, wherein the styrene-butadiene rubber has a styrene content of from 0.1 to 70% by mass.

13. The rubber composition according to claim 10, wherein the butadiene rubber has a weight-average molecular weight of from 90,000 to 2,000,000.

14. The rubber composition according to claim 10, wherein the butadiene rubber has a vinyl content of 50% by mass or less.

15. The rubber composition according to claim 1, wherein the polymer has a molecular weight distribution of from 1.0 to 8.0.

16. A tire, comprising:
    the rubber composition of claim 1.

* * * * *

UNITED STATES PATENT AND TRADEMARK OFFICE
CERTIFICATE OF CORRECTION

PATENT NO. : 9,228,077 B2
APPLICATION NO. : 14/380534
DATED : January 5, 2016
INVENTOR(S) : Daisuke Koda et al.

It is certified that error appears in the above-identified patent and that said Letters Patent is hereby corrected as shown below:

Claims

At column 32, line 8, Claim 1, delete in its entirety and replace with the following:

--1. A rubber composition, comprising:
a rubber component,
a farnesene polymer and
silica
wherein a content of the polymer in the rubber composition
is from 1 to 100 parts by mass on the basis of 100 parts by mass of the rubber component.--

Signed and Sealed this
Nineteenth Day of July, 2016

Michelle K. Lee
*Director of the United States Patent and Trademark Office*